United States Patent [19]

Barcelon et al.

[11] Patent Number: 5,030,459

[45] Date of Patent: Jul. 9, 1991

[54] HIGH IMPACT MINT FLAVOR FOR HIGH BASE CHEWING GUM

[75] Inventors: Shirley A. Barcelon, Randolph; Mamoun M. Hussein, Mountain Lakes; Subraman R. Cherukuri, Towaco, all of N.J.; Gul Mansukhani, Staten Island; Steven M. Faust, Stanhope, N.J.

[73] Assignee: Warner-Lambert Company, Morris Plains, N.J.

[21] Appl. No.: 432,465

[22] Filed: Nov. 7, 1989

[51] Int. Cl.⁵ .................. A23G 3/30; A23L 1/222
[52] U.S. Cl. .................... 426/3; 426/533; 426/651; 426/548; 426/804
[58] Field of Search ...................... 426/3-6, 426/651, 548, 804

[56] References Cited

U.S. PATENT DOCUMENTS

| | | | |
|---|---|---|---|
| 4,440,790 | 4/1984 | Blackwell et al. | 426/3 |
| 2,060,461 | 11/1936 | Dyckman | 426/3 |
| 3,821,417 | 6/1974 | Westall et al. | 426/3 |
| 4,170,633 | 10/1979 | Wagenknecht et al. | 426/3 |
| 4,241,091 | 12/1980 | Stroz et al. | 426/4 |
| 4,456,621 | 6/1984 | Blackwell et al. | 426/3 |
| 4,476,142 | 10/1984 | Netherwood et al. | 426/3 |
| 4,724,151 | 2/1988 | Mansukhami et al. | 426/3 |
| 4,765,991 | 8/1988 | Cheruhuri et al. | 426/3 |

*Primary Examiner*—Jeanette Hunter
*Attorney, Agent, or Firm*—Craig M. Bell

[57] ABSTRACT

An improved, reduced calorie, high base content chewing gum composition possesses a greater, more intense initial flavor impact of increased duration. The method of preparation utilizes highly fractionated or rectified flavor oils from which are removed the terpene and sesquiterpene components resulting in an enhanced and sustained flavor release from the gum base. The deterpenated oils have a lesser affinity for the gum base allowing for the use of higher gum base levels for the reduction of calories without the flavor oils being trapped therein. The sustained flavor release is also improved by the complete or partial renewal of several bitter tasting components previously associated with the oils.

23 Claims, 4 Drawing Sheets

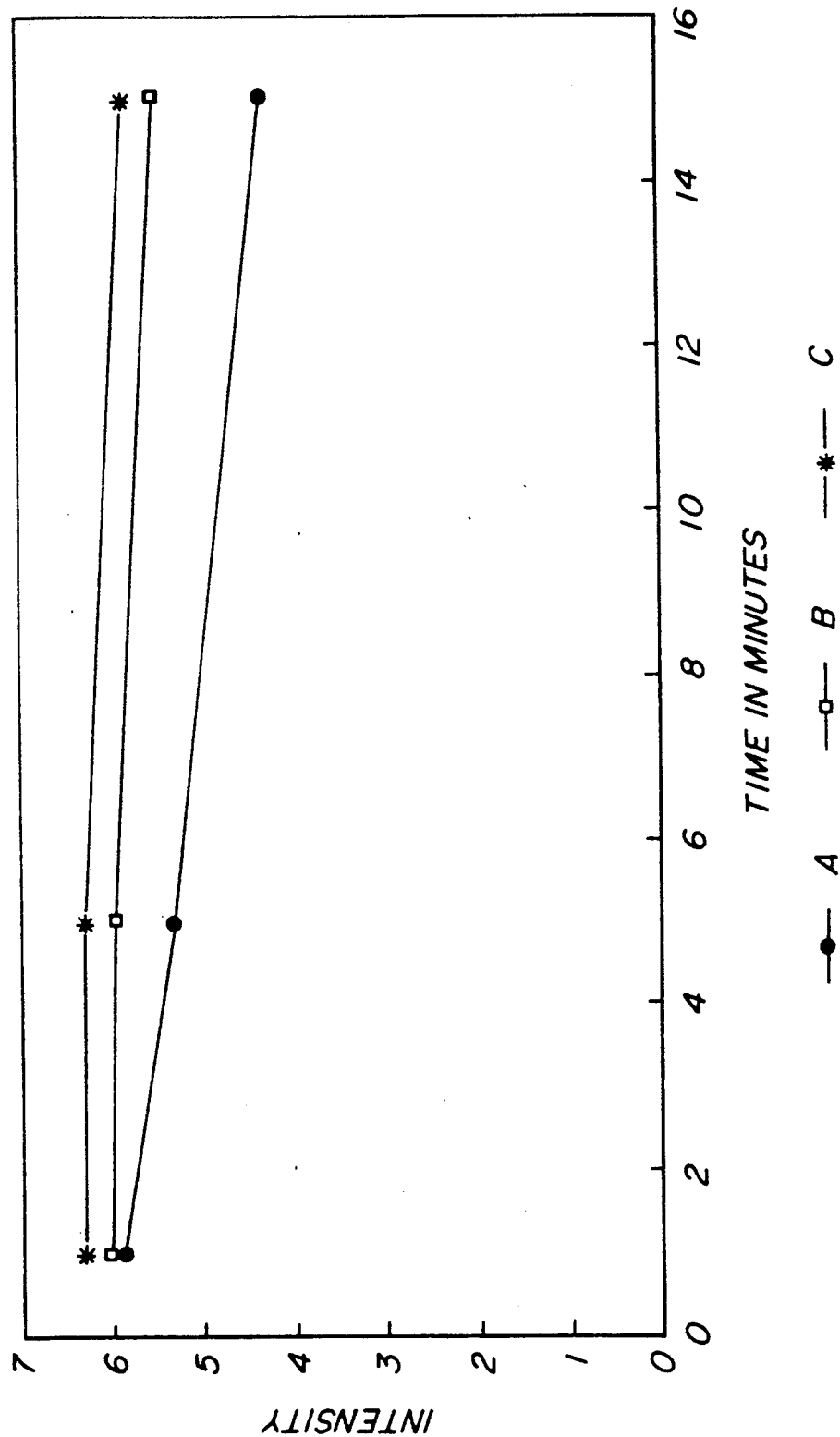

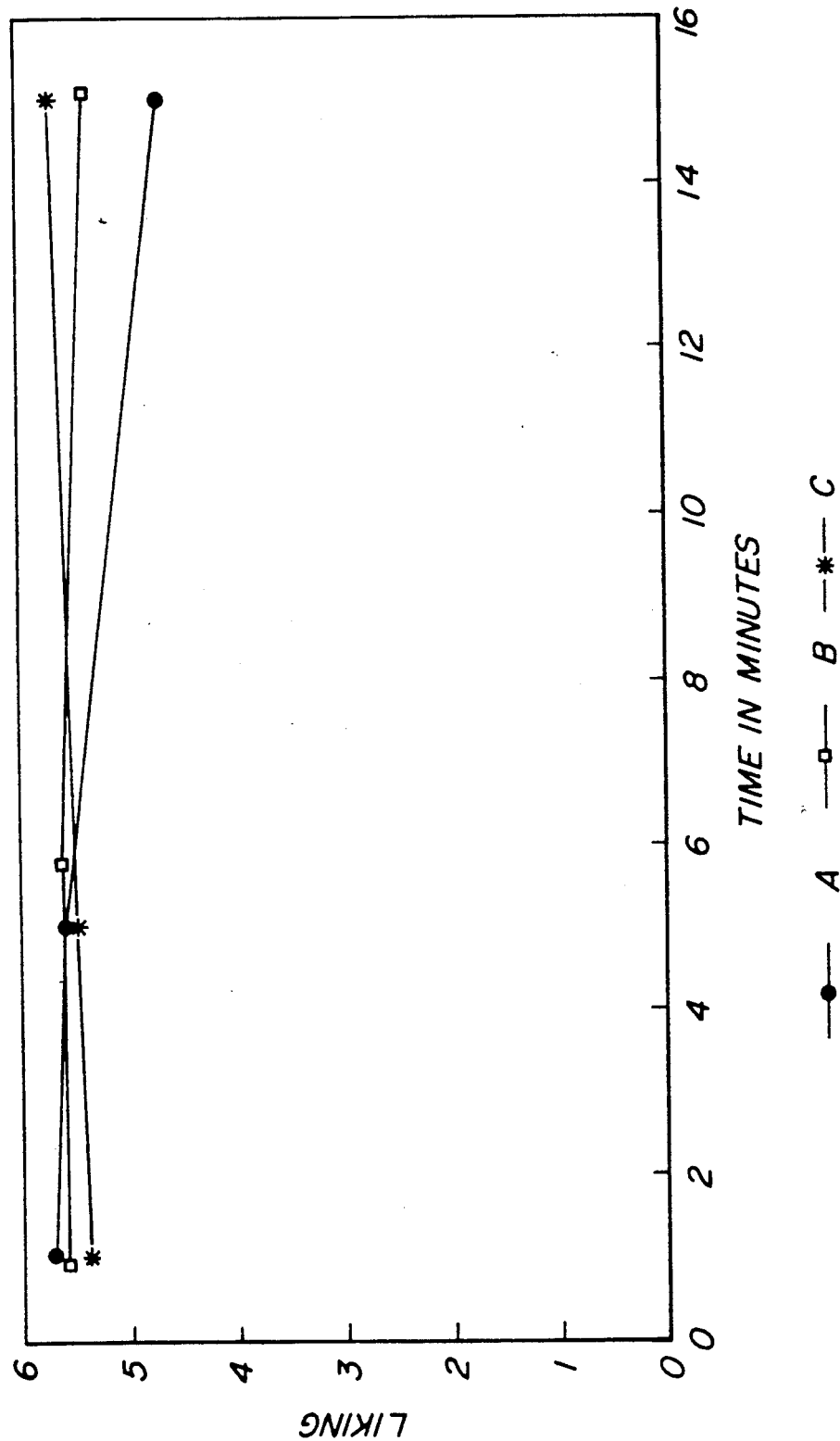

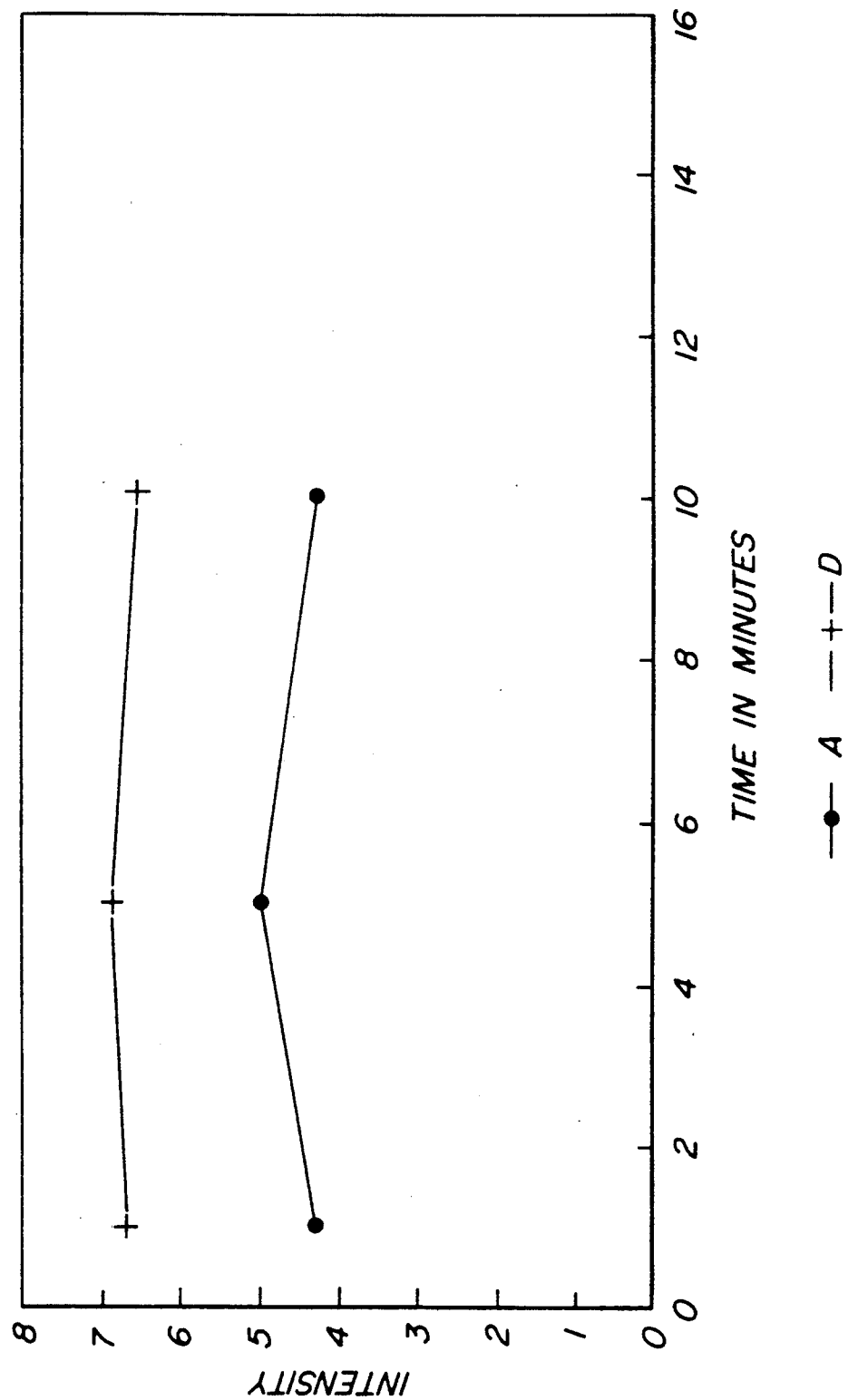

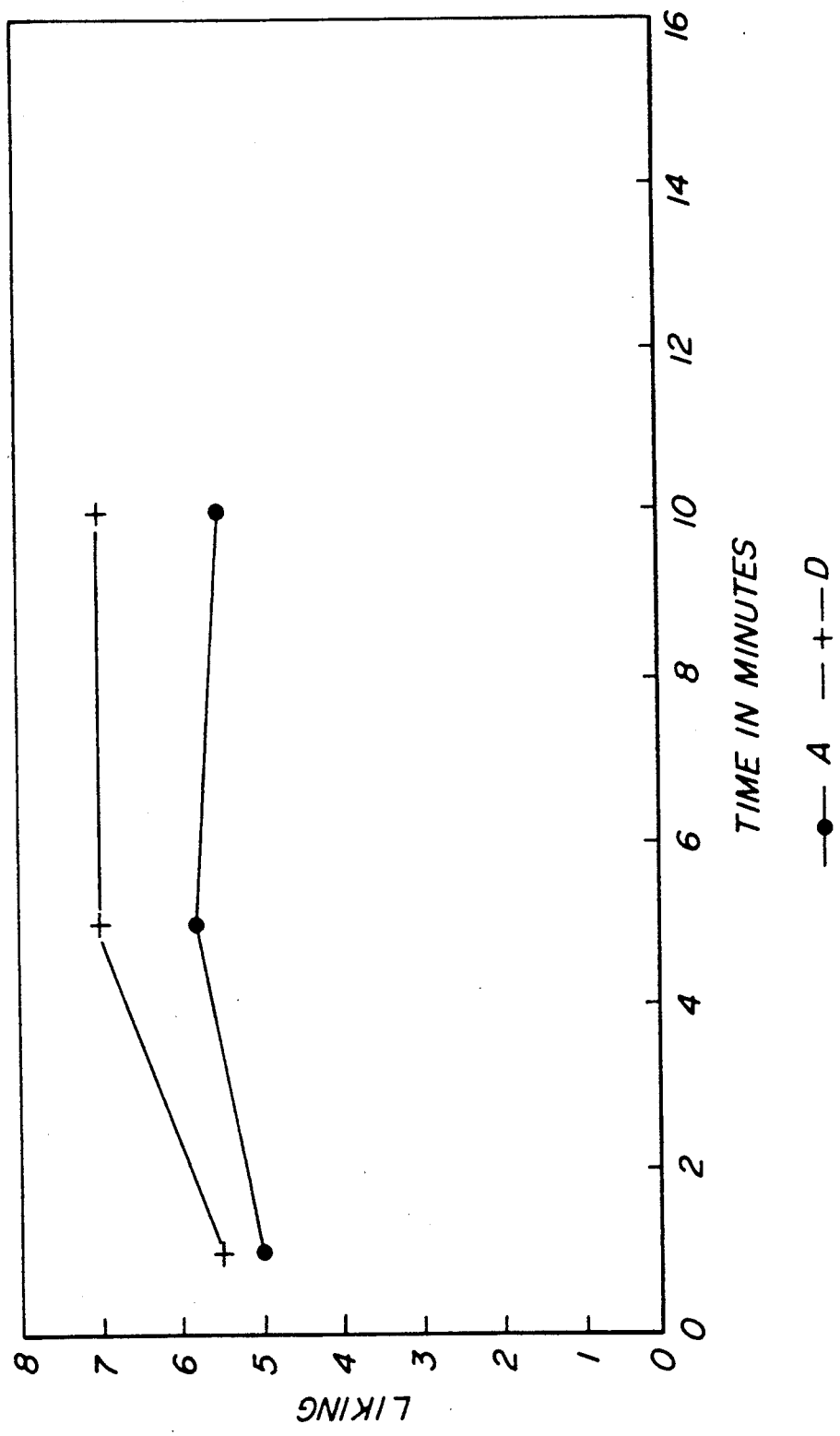

HIGH IMPACT MINT FLAVOR FOR HIGH BASE CHEWING GUM

BACKGROUND OF THE INVENTION

To reduce calories in chewing gum it is often necessary to replace the soluble sugar and/or sugar alcohol bulking agents with low calorie alternatives. The soluble sugar and sugar alcohol bulking agents not only impart necessary sweetness but also a discontinuity to the gum base which results in a softer more pleasant chew and mouth feel.

Flavor release from chewing gum is influenced by many factors, the most important of which are the type and amount of gum base and the type and amount of flavor. The composition of the flavor, if varied, may result in a change of flavor release characteristics. The gum base on the other hand, acts as a trap for the flavor. The stronger the affinity of the flavor components for the gum base, the slower will be the flavor release from the gum.

The problem of slow or delayed flavor release from chewing gum becomes acute when gum base content is high. The current trend and popularity of low or reduced calorie chewing gum products necessitates the use of high gum base levels. An increase of gum base levels requires an appreciable increase of flavor levels in the gum. This increase, however, does not solve the problem of slow flavor release and delayed initial flavor impact upon chewing. Moreover, an appreciable increase in the flavor ingredient may result in excessive softening of the gum giving a poor chew and texture. Good flavor impact and sustained flavor release are desirable attributes in any chewing gum, especially in reduced calorie, high base content chewing gums.

The present invention relates generally to an improved low calorie, high base content chewing gum composition with an increased flavor intensity, duration, and method for its preparation. More specifically, the present invention relates to the use of specially extracted or fractionated flavor oils which bring about an enhanced and sustained flavor release in chewing gum compositions with high gum base preparations. In particular, the present invention concerns the use of highly fractionated terpeneless and sesquiterpeneless mint oils in high gum base content gum compositions which results in superior flavor release attributes.

Rockland et al. U.S. Pat. No. 3,867,262 discloses a process for the preparation of terpeneless essential oils whereby the oil is distilled to remove non-volatile materials. The volatile components are adsorbed onto a solid alumina adsorbant which has been pre-treated with ethyl acetate that alters the relative affinity of the adsorbant for the terpenes and for the oxygenated components of the oil. The terpenes are separated from the desired constituents of the oil by elution of the adsorbant with a terpenephilic solvent.

The present invention utilizes a rectification or fractionation process that does not require adsorption or elution of the essential oils. The fractionation removes the "heads" and "tails" of the oils which are primarily comprised of monoterpenes and sesquiterpenes. These are removed by vacuum distillation or on a spinning band column. By removing the monoterpenes and sesquiterpenes in this manner, the mint oils are rendered more hydrophilic resulting in superior flavor release attributes.

BRIEF DESCRIPTION OF THE DRAWINGS

FIG. 1 is a graph depicting the flavor release rates of standard peppermint gum (A) with two gum compositions (B+C) made with fractionated and terpeneless peppermint oils of the present invention.

FIG. 2 is a graph comparing the overall degree of liking as expressed by a test panel over time for the same three gum compositions comprised of standard peppermint oil (A) and fractionated mint oils (B+C) of the present invention.

FIG. 3 is a graph comprising the change in flavor intensity over time that occurs in a gum with standard peppermint oil (A) and a specially fractionated peppermint oil with a lower menthonic fraction (D).

FIG. 4 is a graph comprising the overall degree of liking as expressed by a taste panel over time for a gum with standard peppermint oil (A) and one with a specially fractionated peppermint oil with a lower menthonic fraction (D).

SUMMARY OF THE INVENTION

It is an object of the present invention to provide a low calorie, high base content chewing gum with improved taste and more up front, longer lasting flavor and a method for its production. The essential mint oils that impart the flavor of interest are fractionated or rectified by vacuum distillation or on a spinning band column. The fractionation removes the "heads" and "tails" of the oil components which are essentially monoterpenes and sesquiterpenes. The removal of these compounds from the oil reduces the affinity of the flavor oil for the gum base and therefore, better up front flavor impact, greater sustained flavor release and improved taste are made possible.

DETAILED DESCRIPTION OF THE INVENTION

The reduced calorie chewing gum compositions of the present invention can be prepared as a variety of gum products such as stick gum, slabs, chunk, balls, ropes, tablets and/or center-filled gum products. In order to produce a reduced calorie or low calorie gum, it is advisable and necessary to increase the gum base to high levels thereby reducing the otherwise caloric components such as carbohydrates and bulk sweeteners.

Most reduced or light calorie chewing gum compositions generally contain about 25% by weight of a water insoluble gum base, inert fillers or texturizing agents in amounts of at least 40% by weight up to 90% or more, a water soluble flavoring agent and water soluble sweeteners such as sucrose and corn syrup or in sugarless gum sorbitol, mannitol and artificial sweeteners. Also incorporated within the gum base may be plasticizers or softeners to improve consistency and texture of the gum.

The gum base of reduced or light calorie chewing gum generally contains a natural rubber gum base, a synthetic rubber gum base and/or mixtures thereof. When synthetic gum bases are utilized, the preferred elastomer component has been the styrene-butadiene copolymer (SBR). Gum base is noncaloric and insoluble. A chewing gum composition high in gum base content may also thus be reduced in calories.

Previous attempts to produce such high gum base content low calorie chewing gum compositions have resulted in products with a hard, tight, rubbery chew and poor texture.

The type and amount of gum base employed will vary greatly depending on various factors such as the intended bulk sweetener content of the final product, the type of base used and other components used to make the final product. The chewing gum compositions of the instant invention preferably contain a soft polyvinyl acetate (PVA) gum base. In general, gum base amounts of about 50% to about 95% by weight of the final chewing gum composition are acceptable for use in the chewing gum compositions of the preferred invention with preferred amounts of about 55% to about 85% and most preferred amounts from about 60% to about 70% by weight.

Soft PVA gum bases are defined as providing a hydrophilic chew character to the chewing gum, which, when formulated into a chewing gum, results in a composition that absorbs moisture to swell and soften in the mouth. This results in a pleasant, moist chew.

Preferably, the gum base used in this invention may be any water insoluble gum base having polyvinyl acetate as an ingredient together with a natural or synthetic elastomer or mixtures thereof. Such gum bases are known in the art and an example of such a soft PVA-containing gum base is found in U.S. Pat. No. 4,490,395 which is hereby incorporated by reference. Illustrative examples of natural elastomers in gum bases include, without limitation, substances of vegetable origin such as chicle, jelutong, gutta percha and crown gum. Examples of synthetic elastomers include, without limitation, isobutylene-isoprene copolymers, styrene-butadiene copolymers, polyethylene, polyisobutylene and mixtures thereof.

The elastomer content employed is in an amount of from about 0.5 to about 20%, and preferably about 2.5% to about 15% by weight of the gum base. When the total amount of elastomer is below 0.5% the base composition lacks elasticity, chewing texture, and cohesiveness whereas at amounts above about 20% the formulation is hard and rubbery and maintains a tight chew.

The gum base composition contains elastomer solvents to aid in softening the polymer components. Such elastomer solvents comprise methyl, glyceryl or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, pentaerythritol ester of wood rosin, glyceryl ester of partially dimerized rosin, glyceryl ester of polymerized rosin, glyceryl ester of tall oil rosin, glyceryl ester of wood rosin, and partially hydrogenated wood rosin and partially hydrogenated methyl ester of wood rosin; terpene resins including polyterpene and polymers of alpha-pinene or beta-pinene and mixtures thereof. The elastomer solvents may be employed in amounts ranging from about 2% to about 55% and preferably from about 4% to about 18% by weight of the gum base. Amounts below about 2% cause the chew characteristic to be hard and result in inconsistent flavor release. Amounts above 55% cause a soft product to form which destroys the chew characteristic.

Vinyl polymers, and in particular polyvinyl acetate (PVA) serve as excellent gum bases. The preferred PVA has a molecular weight of at least 2,000. Such materials are commercially available in various molecular weights which can be successfully used. Preferably, any PVA utilized in the present invention will have a medium molecular weight of about 35,000 to about 55,000 and blends of low and medium molecular weight PVA's are acceptable. The polyvinyl acetate is employed in amounts of about 5% to about 45% by weight and preferably about 7% to about 35% by weight. These materials when used in such high amounts aid in extending the elastomer mixture while maintaining product integrity and also provide a hydrophilic soft chew. Amounts below about 5% cause the base to be unstable. Amounts above 45% cause segregation of gum constituents to occur.

Glyceryl monostearate may be used as a suitable emulsifier. When absent, the formulation usually has a poorer stability and lacks acceptable texture. It is believed that the glyceryl monostearate aids in bringing the normally immiscible constituents together in such a way that they form a single finely dispersed stable system. This emulsifier also simplifies the incorporation of flavors into the final base and aids in retaining finely divided solvents within the gum base complex. The glyceryl monostearate is employed in amounts of about 1% to about 15% and preferably about 3% to about 9%. Additional emulsifiers may also be included, notably lecithin, fatty acid and monoglycerides, diglycerides and triglycerides, propylene glycol monostearate and mixtures thereof. Such materials may be used in the amount of about 1% to about 25% by weight.

The gum base formulation generally also employs wax material. The waxes have been found to soften the polymer elastomer mixture and improve elasticity of the chew character. The waxes employed are preferably microcrystalline wax, paraffin wax and combinations thereof. Useful amounts are from about 2% to about 25% by weight and preferably from about 2.5% to about 20% by weight of the gum base composition. Preferably these waxes are used in combination in amounts of about 5% to about 20% microcrystalline wax and about 3% to about 15% paraffin wax.

A variety of additional ingredients such as plasticizers or softeners may optionally be added. These materials are optional and not essential in the present formulation. Such materials include hydrogenated vegetable oils, lanolin, stearic acid, sodium stearate, potassium stearate, glyceryl triacetate, acetylated monoglycerides, glycerin and the like and mixtures thereof. Such materials when incorporated into the gum base obtain a variety of desirable texture and consistency properties. These individual materials are generally employed in amounts of up to about 30%, preferably about 1% to about 25% by weight and most preferably in amounts of from about 1.5% to about 12% by weight of the gum base composition. Because of the low molecular weight of these compounds, they are able to penetrate the fundamental structure of the base making it plastic and less viscous.

The bulk sweetening agent may be selected from a wide range of water-soluble agents. Without being limited to particular sweeteners, representative illustrations encompass monosaccharides, disaccharides, and polysaccharides such as xylose, ribose, glucose, mannose, galactose, fructose, dextrose, polydextrose, cellulose, sucrose, maltose, partially hydrolyzed starch or corn syrup solids, palatinit and sugar alcohols such as sorbitol, xylitol, mannitol, maltitol and mixtures thereof.

In general, the amount of bulk sweetener may vary with the desired amount of sweetness selected for a particular chewing gum composition and should be a quantity adequate to provide sufficient discontinuity to the gum base. This amount will normally be less than about 50% by weight when using an easily extractable sweetener. The water-soluble bulk sweeteners described above are preferably used in amounts of at least 5% to about 35% by weight, and most preferably from about 10% to about 25% by weight of the final chewing gum composition. The artificial intense sweetener may be selected from water-soluble artificial sweeteners and dipeptide-based sweeteners, including mixtures thereof. Without being limited to particular sweeteners, representative illustrations encompass the soluble saccharine salts, i.e., sodium or calcium saccharine salts, the free acid form of saccharin, cyclamate salts, acesulfame-K and the like, dipeptide sweeteners such as L-aspartyl-L-phenylalanine methyl ester and materials described in U.S. Pat. No. 3,192,131 and the like, and chlorosucrose compounds.

The intense sweetener is added in an amount greater than 0.01% by weight in order to provide longer lasting sweetness to the chewing gum composition. Amounts of up to about 5.0% by weight are acceptable, and amounts up to about 2.5% by weight are preferred. Amounts up to about 1.00% by weight are most preferred, and most preferably between about 0.10% to about 0.60% by weight of intense sweetener will be used. This quantity of intense sweetener in combination with less than 50% bulk sweetener unexpectedly provides a chewing gum composition having longer lasting sweetness. The sweetener is administered in either the free form, the encapsulated form or in mixtures thereof to provide a consistent delivery of longer lasting sweetness.

Encapsulated delivery systems for the sweetening agents comprise a hydrophobic matrix of fat or wax surrounding a sweetener or flavoring component. The fats may be selected from any number of conventional materials such as fatty acids, glycerides, polyglycerol esters, sorbitol esters, and mixtures thereof. Examples of fatty acids include hydrogenated and partially hydrogenated vegetable oils such as palm oil, palm kernel oil, peanut oil, rapeseed oil, rice bran oil, soybean oil, cottonseed oil, sunflower oil, safflower oil and mixtures thereof. Other fatty acid oils are contemplated. Glycerides which are useful include mono-, di- and triglycerides.

Useful waxes are chosen from among the group consisting of natural or synthetic waxes and mixtures thereof. Non-limiting examples include paraffin wax, petrolatum, carbowax, microcrystalline wax, beeswax, carnuba wax, candellila wax, lanolin, bayberry wax, sugarcane, spermaceti wax, rice bran wax and combinations thereof.

The fats and waxes may be used individually or in combination in amounts varying from about 10 to about 70% by weight of the delivery system, and preferably in amounts of about 40 to about 58% by weight. When used in a combination, the fat and wax are preferably present in a ration of about 70:10 to about 85:15 of fat to wax.

Typical encapsulated flavor or sweetener delivery systems are disclosed in U.S. Pat. Nos. 4,597,970 and 4,722,845 which are hereby incorporated by reference. The chewing gum composition of this invention may additionally include the conventional additives or coloring agents such as titanium dioxide; emulsifiers such as lecithin and glycerol monostearate; and fillers such as dicalcium phosphate, aluminum hydroxide, alumina, aluminum silicates, talc, calcium carbonate and combinations thereof. The total amount of fillers present is generally up to about 10% by weight. The colorants useful in the present invention include the pigments that may be incorporated in amounts of up to about 6% by weight and preferably up to about 1% by weight. A preferred pigment is titanium dioxide, also the colorants may include other dyes suitable for food, drug and cosmetic applications, and known as the FD&C dyes and the like. The materials acceptable for the foregoing spectrum of use are preferably water soluble. Illustrative examples include the indigo dye, known as FD&C Blue No. 2, which is the disodium salt of the 5,5-indigotindisulfonic acid. Similarly, the dye known as FD&C Green No. 1, comprises a triphenylmethane dye and is the monosodium salt of 4-[4-N-ethyl-p-(sulfobenzylamino)diphenylmethylene]-[1-(N-ethyl-p-sulfoniumbenzyl)2,5-cyclohexadienimine]. A full recitation of all FD&C and D&C colorants and their corresponding chemical structures may be found in the Kirk-Othmer Encyclopedia of Chemical Technology, Third Edition, in Volume 6 at pages 561–595, which text is accordingly incorporated herein by reference.

The flavor oil that is incorporated into the high gum base composition has been fractionated or rectified using standard distillation equipment to remove the terpene components that possess the high affinity for the gum base and cause the flavors to be trapped therein. This is carried out through standard distillation procedures using a vacuum distillation apparatus or a spinning band column. Terpenes themselves are simple, non-saponifiable lipids which are multiplies of the isoprene molecule ($C_5H_8$) whose molecular formula (I) is set forth below.

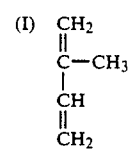

Monoterpenes (II) are basically comprised of two of the above isoprene units whereas sesquiterpenes (III) are comprised of three of these units.

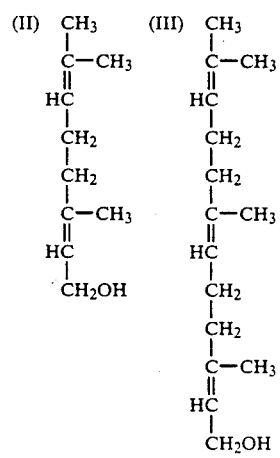

Standard deterpenation, which results in removal of most of the "head" (monoterpene) fraction from the essential oil is also beneficial in providing enhanced flavor release. The benefit, however is less than when the fractionation of the oil is from the "head" as well as the "tail" fractions.

An additional type of fractionation of peppermint oil was done by extensive distillation or rectification whereby more of the head and tail as well as specific middle fractions were removed. It is evident that repeated distillations in this manner removed not only the mono- and sesquiterpenes but the menthonic fraction as well in a number of the mint flavor oils.

The major constituents of the "menthonic" fraction are menthone, its isomer iso-menthone, and menthofuran. Menthone has been traditionally understood to be an essential component of peppermint oil. Reducing the oil to more than 50% of the menthone and iso-menthone content as well as removal of the major portion of menthofuran has resulted in an improved quality oil. The improved oil possessed a clean mentholic sensation without the heavy herbal and resinous character. The oil had a reduced bitter taste and it would appear that the removed menthonic fraction and the tail fraction seem to contribute to the unpleasant bitter taste of peppermint.

Flavoring oils of particular utility in the practice of the present invention are those of the mint variety such as peppermint, spearmint and corn mint (mentha arvensis). The amount of deterpenated flavor oil employed is normally a matter of preference but it has been found that amounts ranging from approximately 0.1% to approximately 4.0% by weight of the final chewing gum composition are usable with amounts of about 0.3% to about 3.0% by weight being preferred. The mint oils of the present invention can be utilized as the sole flavorant or can be combined with other standard single distillation mint oils.

A method for forming the chewing gum of the invention includes melting the gum base and mixing the gum base in a kettle with a portion of the bulk sweetening agent until a uniform mixture is formed. The balance of the sweetening agent, flavor, artificial intense sweetener and other conventional ingredients, if any, are added next with continued mixing until a homogeneous mass is formed. The product is recovered from the kettle and shaped to form stick, slab, chunk, ball, rope, shredded, tablet and/or center-filled gum products.

An illustrative process involves first melting the gum base at a temperature from about 70° C. to about 120° C. and mixing the gum base in the kettle with ⅔ or ¾ of the sweetening ingredients for 2–8 minutes. To this mixture, optional fillers or colorants are added and mixing is continued for 1-4 minutes. The remaining sweetening ingredients are added and while mixing is continued, the flavoring agent is added slowly. The mixing is continued until a homogeneous mass is formed. The gum is discharged from the kettle and formed into its desired shapes such as sticks, slabs, chunks, balls, ropes, shredded, tablets and/or center-filled.

The following examples serve to provide further appreciation of the invention but are not meant in any way to restrict the effective scope of the claims. All percentages throughout the specification are by weight % of the final composition unless otherwise indicated.

EXAMPLE 1

Three peppermint flavored high-base chewing gums were prepared according to standard gum making procedures disclosed herein and known in the art in the following formulations:

| Ingredient | A | B | C |
| --- | --- | --- | --- |
| Gum base | 65.00% | 65.0% | 65.0% |
| Polyols | 26.23 | 26.23 | 26.23 |
| Softeners | 5.20 | 5.20 | 5.20 |
| Aspartame | 0.35 | 0.35 | 0.35 |
| Encapsulated Aspartame | 0.92 | 0.92 | 0.92 |
| Peppermint oil: | | | |
| Low rectification, standard oil | 1.90 | — | — |
| High rectification | — | 1.90 | — |
| High rectification & deterpination | — | — | 1.90 |
| Spray-dried peppermint flavor | 0.40 | 0.40 | 0.40 |

The gum samples were chewed for 15 minutes and were rated by experienced and expert tasters for flavor intensity and flavor liking at 1, 5, and 15 minutes of the chewing period. The intensity and flavor liking ratings of the gums on chewing are shown in FIGS. 1–4.

As shown in FIG. 1, sample C which contains highly fractionated and deterpenated peppermint oil resulted in higher intensity flavor, i.e. higher flavor release throughout the chewing period. A sustained flavor release was attained even after 30 minutes chew. Sample B, which contained highly rectified oil but was not fully deterpenated, had higher flavor release than the control sample, (A). Both samples B and C were also rated higher in liking than the control in the later stage of the chew period (FIG. 2). The inventive highly fractionated oils resulted in very pleasant and less bitter tasting gums than the unfractionated oil.

The peppermint oil in sample C was specially fractionated to remove the monoterpenes fraction, "heads" and the major portion of the "tail" fraction, which contains the sesquiterpene compounds and their derivatives. Sample B, on the other hand, contained a moderately fractionated oil with approximately 50% removal of the monoterpene and tail sesquiterpene fraction. Sample A was redistilled to conform with USP specification, whereby only a small fraction of the oil was removed.

EXAMPLE 2

A high base chewing gum was prepared with a lowermenthone fraction oil as follows:

| Ingredient | D |
| --- | --- |
| Gum base | 65.00% |
| Polyol | 26.23 |
| Softeners | 5.20 |
| Aspartame | 0.35 |
| Encapsulated Aspartame | 0.92 |
| Highly rectified & deterpinated peppermint oil with low menthonic fraction | 1.90 |
| Spray-dried peppermint flavor | 0.40 |

As shown in FIGS. 3 and 4, the gum made with the lower menthone peppermint oil was rated superior by the expert taste panel and was considered better tasting, less bitter, cleaner and possessed more mentholic flavor, having higher and more sustained flavor release than the control gum, A.

FIG. 1 shows that the highly rectified and deterpenated oil is more liked and has higher flavor intensity on chewing. The flavor intensity is more sustained, i.e.

the drop in intensity from initial impact to the latter chew is less, in the gums with higher rectification and more deterpenated oils (B, C). FIGS. 2 and 3 show lower intensity and lower liking ratings for the standard rectified oil (A) than for the highly fractionated and lower menthone oil (D).

Gas chromatographic analyses were performed on oils used in the preceding examples. The results are in Table 1. The data show the fractions of peppermint oil which were affected. The oils B, C, and D of the present invention are considerably lower in the "head fraction," which includes the non-oxygenated monoterpenes (limonene, alpha-pinene, beta-pinene, sabinene, terpinolene), cineole, and 3-octanol. They are also lower in the "tail fraction," which includes pulegone, germacrene and other sesquiterpenes.

TABLE 1

Comparative gas chromatographic analyses of the peppermint oils.

| Component | A (%) | B (%) | C (%) | D (%) | E (%) |
|---|---|---|---|---|---|
| Isobutyraldehyde | 0.04 | 0 | 0 | 0 | 0 |
| Isovaleraldehyde | 0.19 | 0 | 0 | 0 | 0 |
| A-Pinene | 0.73 | 0 | 0.10 | 0 | 0 |
| B-Pinene | 0.95 | 0 | 0.25 | 0 | 0.02 |
| Sabinene | 0.45 | 0 | 0.12 | 0 | 0.01 |
| Myrcene | 0.20 | 0 | 0.07 | 0 | 0.02 |
| A-Terpinene | 0.34 | 0 | 0 | 0 | 0.07 |
| L-Limonene | 1.49 | 0.11 | 0.68 | 0 | 0.30 |
| 1,8-Cineole | 4.64 | 0.37 | 2.89 | 0 | 1.81 |
| Cis-Ocimene | 0.30 | 0.08 | 0.17 | 0 | 0.09 |
| G-Terpinene | 0.68 | 0.20 | 0.54 | 0 | 0.31 |
| P-Cymene | 0.18 | 0 | 0.15 | 0 | 0.05 |
| Terpinolene | 0.15 | 0.14 | 0.11 | 0 | 0.14 |
| 3-Octanol | 0.24 | 0.14 | | | |
| 1-Octen-3-ol | 9.17 | 0.11 | 0.17 | 0 | 0.09 |
| trans-Sabinese Hydrate | 1.04 | 1.04 | 0.12 | 0.18 | 0.98 |
| L-Menthone | 19.33 | 23.13 | 22.28 | 10.84 | 23.80 |
| Menthofuran | 1.84 | 2.02 | 1.95 | 0.50 | 2.30 |
| Iso-menthone | 2.63 | 3.30 | 3.11 | 2.04 | 3.16 |
| B-Bourbonene | 0.45 | 0.35 | 0.43 | 0.61 | 0.42 |
| Linalool | 0.22 | 0.23 | 0.18 | 0.32 | 0.33 |
| Menthyl Acetate | 5.14 | 5.15 | 4.59 | 7.54 | 4.42 |
| Neo-menthol | 4.04 | 5.04 | 5.75 | 6.48 | 5.31 |
| B-Caryophyllene | 1.62 | 0.89 | 1.37 | 2.07 | 0.60 |
| Terpinen-4-ol | 1.13 | 1.43 | 1.62 | 1.05 | 1.17 |
| L-Menthol | 41.11 | 51.35 | 46.87 | 63.57 | 46.77 |
| Pulegone | 1.25 | 1.09 | 1.48 | 1.63 | 1.36 |
| Germacrene-D | 2.12 | 0.37 | 1.92 | 0.70 | 1.89 |
| Piperitone + | 0.99 | 0.64 | 0.62 | 0.92 | 0.58 |
| Viridiflorol | 0.37 | 0.18 | 0.10 | 0 | 0.18 |

A: Standard peppermint oil
B: Highly fractionated and terpeneless oil
C: Moderate fractionation
D: Special fractionated & lower menthone fraction
E: Terpeneless oil, standard deterpenation, "head" fraction cut only.

The lower menthone oil, as shown in Table 1, not only has very low "head" and "tail" fractions, but also was tailored to reduce the amount of other components which are not disturbed in traditional distillations and processing of peppermint oil, e.g. 3-octanol, 1-octen-3-ol, menthofuran, and iso-menthone. The monoterpenes in this oil were completely removed, while in the highly fractionated oil (B) traces of them remained As will become clear to one skilled in the art, many processing parameters, flavor agents and other embodiments of the present invention may be varied or changed to a minor degree and these minor modifications should not be regarded as a departure from the invention as described herein. All such embodiments are intended to fall within the spirit and scope thereof as defined by the following claims.

What we claim is:

1. A low calorie, high base content chewing gum composition with improved flavor intensity and duration comprising;
   a) a gum base in an amount between about 50% and about 90% by weight of said composition;
   b) a deterpenated and fractionated flavor oil
   c) an intense sweetener in an amount between about 0.01% and about 3.0% by weight of said composition; and
   d) a bulking agent in an amount between approximately 10% and 40% by weight of said composition.

2. The composition of claim 1, wherein the gum base comprises polyvinyl acetate (PVA) and a natural or synthetic elastomer selected from the group consisting of chicle, jelutong, gutta percha, crown gum, isobutyleneisoprene copolymer, styrene-butadiene copolymer, polyethylene, polyisobutylene and mixtures thereof.

3. The composition of claim 1, wherein said gum base is present in an amount between about 50% and about 70% by weight of said composition.

4. The composition of claim 1 wherein said deterpenated and fractionated flavor oil is a mint oil.

5. The composition of claim 4 wherein said terpenes and fractions have been removed from said mint oil by extraction or fractionation.

6. The composition of claim 5 wherein said terpenes are selected from the group comprising monoterpenes and sesquiterpenes.

7. The composition of claim 4 or 6 wherein said mint oil is selected from the group comprising peppermint, spearmint, corn mint and mixtures thereof.

8. The composition of claim 7 wherein said mint oil is present in an amount between about 0.1% and about 4.0% by weight of said composition.

9. The composition of claim 8 wherein said mint oil is present in an amount of about 0.3% to about 3.0% by weight of said composition.

10. The composition of claim 1, wherein said bulking agent is selected from the group consisting of xylose, ribose, glucose, mannose, galactose, fructose, dextrose, polydextrose, cellulose, sucrose, maltose, partially hydrolyzed starch or corn syrup solids, palatinit, sorbitol, xylitol, mannitol, maltitol and mixtures thereof.

11. The composition of claim 10, wherein said bulking agent is present in an amount between about 10% and about 25% by weight of said composition.

12. The composition of claim 11, wherein said intense sweetener is selected from the group consisting of sodium or calcium saccharin salts, the free-acid form of saccharin, cyclamate salts, chlorosucrose derivatives, dipeptide compounds, acesulfame-K and mixtures thereof.

13. The composition of claim 12, wherein said intense sweetener is present in an amount between about 0.01% to about 0.60% by weight of said composition.

14. The composition of claim 13, wherein said dipeptide compound is L-aspartyl-L-phenylalanine methyl ester.

15. A method of preparing a low calorie, high base chewing gum composition with improved flavor intensity and duration comprising:

a) admixing melted soft PVA chewing gum base with a bulk sweetening agent until a uniform mixture is formed;
b) admixing optional fillers and colorants until a uniform mixture is formed;
c) admixing an artificial intense sweetener until a uniform mixture is formed;
d) slowly admixing a deterpenated and fractionated flavoring oil;
e) mixing until a homogeneous mass is formed, and;
f) cooling the resulting mix to form a chewing gum and recovering the product.

16. The method of claim 15, wherein the soft PVA chewing gum base is present in an amount of from about 50% to about 90% by weight of the chewing gum composition and the artificial intense sweetener is present in an amount between about 0.01% to about 3.00% by weight of said composition.

17. The method of claim 16 wherein said artificial intense sweetener is selected from the group comprising sodium or calcium saccharin salts, acid saccharin, cyclamate salts, trichlorogalactosucrose and its derivatives, dipeptide sweeteners, acesulfame-K and mixtures thereof.

18. The method of claim 17 wherein said dipeptide sweetener is L-aspartyl-L-phenylalamine methyl ester.

19. The method of claim 17 wherein said deterpenated and fractionated flavor oil is a mint oil.

20. The method of claim 19 wherein said terpenes and fractions have been removed from said flavor oil by extraction or fractionation.

21. The method of claims 15 or 20 wherein said flavor oil comprises approximately 0.1% to approximately 4.0% by weight of said mixture.

22. The method of claim 21 wherein said mint oil is selected from the group comprising peppermint, spearmint, corn mint and mixtures thereof.

23. The method of claim 20 wherein said fractions comprise the menthones.

* * * * *